Dec. 13, 1955  F. A. RINGE  2,726,552
MOTOR VEHICLE TRANSMISSION
Filed Oct. 5, 1954  2 Sheets-Sheet 2

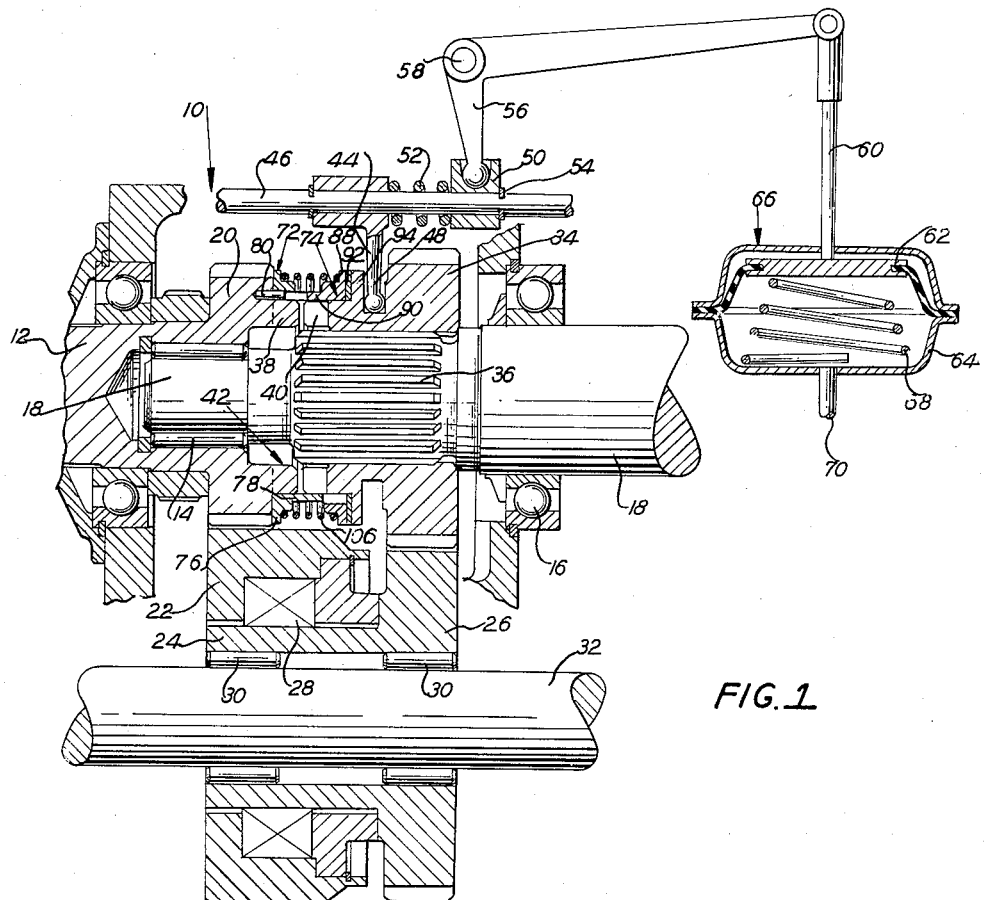

F. A. RINGE
INVENTOR.

BY

ATTORNEYS

United States Patent Office 2,726,552
Patented Dec. 13, 1955

2,726,552

MOTOR VEHICLE TRANSMISSION

Frederick A. Ringe, Detroit, Mich., assignor to Ford Motor Company, Dearborn, Mich., a corporation of Delaware Application October 5, 1954, Serial No. 460,395

5 Claims. (Cl. 74—364)

This invention relates generally to motor vehicle transmissions and has particular reference to a synchronized transmission incorporating a two-way blocker structure.

Although applicable to other types of transmissions as well, the invention is shown here as applied to a truck transmission in which an underdrive or speed reduction gearing is utilized ahead of the transmission proper and in which a speed responsive control is provided to eliminate the gear reduction and drive the transmission directly. The input and output gears of the speed reduction unit are normally held apart by the axial component of the helical gear tooth load, this component being sufficient to hold the gears apart and prevent engagement of clutch elements carried by the two gears even when shift action is undertaken by actuation of a vacuum powered servo unit at a predetermined speed. The input and output gears are provided with annular blocker rings, one of the rings being secured to its associated gear and the other being frictionally coupled to the other gear under spring pressure. The blocker rings are provided with alternate slots and tooth portions with the slots in one of the blocker rings being stepped to form an outer wider portion and an inner narrower portion. The tooth portions of the other blocker ring correspond in width to the width of the narrower portion of the stepped slots. The arrangement is such that synchronization can be affected upon a torque reversal through the speed reduction unit in either direction. For example, with the shift mechanism conditioned by the speed controlled servo unit to effect a shift of the speed reduction gearing from its predetermined speed reduction to direct drive, the shift may be completed by momentarily closing the carburetor throttle to affect a torque reversal and reduce the axial component of tooth load to enable the shift to be made automatically when the input and output gears are synchronized. At this torque reversal the tooth portions of the one blocker ring which are positioned in the wider outer portions of the stepped slots of the other blocker ring are released from interference with the shoulders between the outer and inner portions of the slot and are free to move into the narrower inner portions of the slots thus permitting synchronized engagement of the clutch elements carried by the input and output gears. In addition, the mechanism operates during a torque reversal in the opposite direction, as for example when the vehicle is freewheeling in the speed reduction underdrive so that the input gear is rotating slower than the output gear. The blocking mechanism of this invention prevents clutch engagement under these conditions until synchronized speed is reached between the two gears, but the operation is reversed, with the blocker ring for the output gear driving the blocker ring for the input gear and with the tooth portion of the one ring engaging the shoulder at the opposite side of the stepped slot in the other ring.

The invention will be more fully understood when considered in connection with the accompanying drawing, wherein:

Figure 1 is a semidiagrammatical cross sectional view of a portion of a motor vehicle transmission illustrating the present invention.

Figure 2 is an expanded elevational view of the periphery of the annular blocker rings shown in Figure 1.

Figure 3:
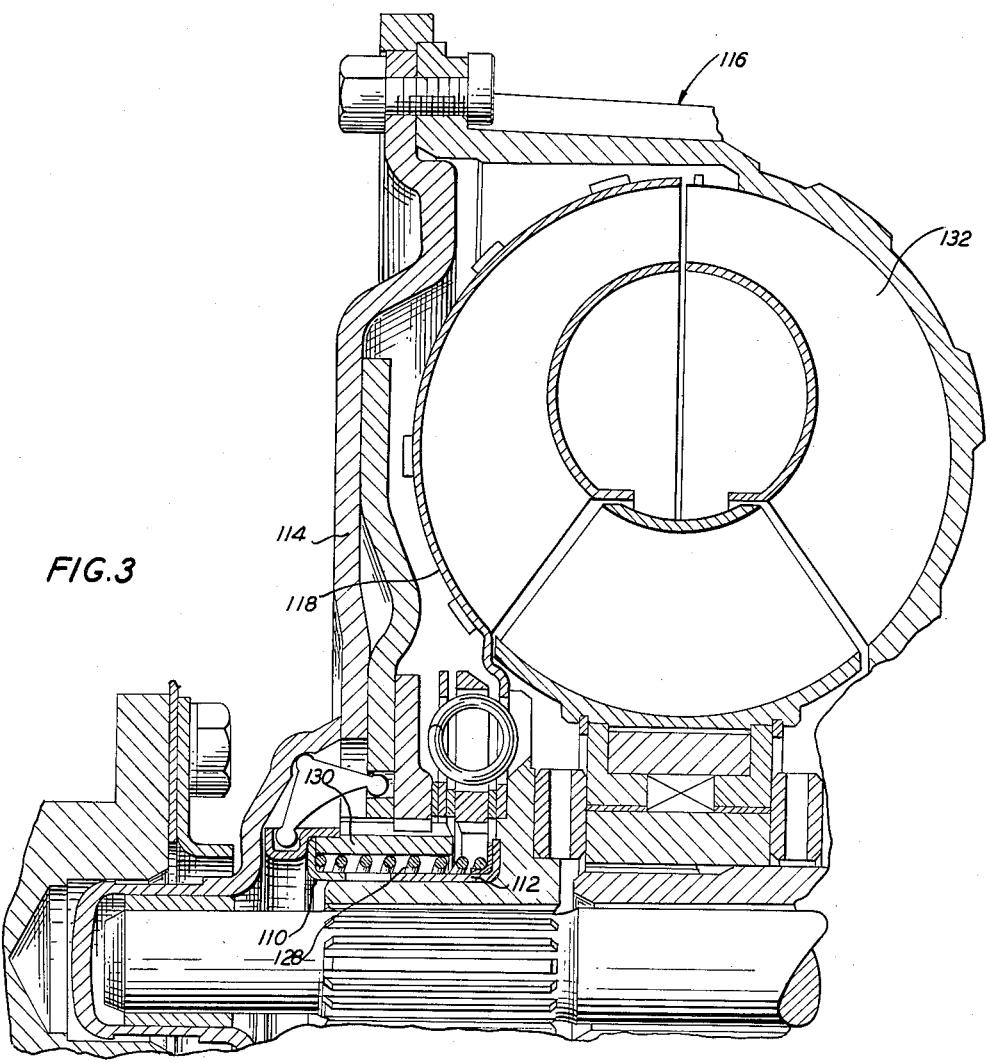
Figure 3 is a cross sectional view of a modification of the invention.

Referring now to the drawings, and particularly to Figures 1 and 2, the reference character 10 indicates generally an underdrive or speed reduction gearing unit having an input shaft 12 adapted to be driven from a motor vehicle engine (not shown). Axially aligned with the input shaft 12 and journaled on bearings 14 and 16 is an output shaft 18 adapted to be connected to the input shaft of a conventional multispeed transmission gear box (not shown). Integrally formed on the end of the input shaft 12 is an input gear 20 arranged to mesh with a gear 22 connected to the hub 24 of a gear 26 by means of an overrunning clutch 28. The gear 26 is journaled by bearings 30 upon a countershaft 32, and meshes with a gear 34 slidably mounted upon the output shaft 18 by means of splines 36. The overrunning clutch 28 is arranged to enable the gear 26 to be driven by the gear 22, but to permit the gear 26 to overrun the gear 22 under certain conditions.

The adjacent faces of the gears 20 and 34 on the input and output shafts 12 and 18 respectively are formed with cooperating clutch teeth 38 and 40 respectively. The clutch teeth 38 and 40 form a jaw clutch 42 which, when engaged, establishes a direct 1—1 drive from the input shaft 12 through the gears 20 and 34 and output shaft 18 to the transmission.

When the jaw clutch 42 is disengaged, the drive to the conventional transmission is through the input shaft 12, input gear 20, countershaft gears 22 and 26, output gear 34 and output shaft 18 to effect a predetermined speed reduction or underdrive.

Shifting the gear 38 along the splines 36 on the output shaft 18 toward the gear 20 to effect a direct drive through the unit is accomplished by means of a shifting fork 44 secured to a shift rail 46 and engageable in an annular groove 48 formed in the hub of the gear 34. A sleeve 50 is slidably mounted upon the rail 46 and is normally held by a coil spring 52 against a stop 54. The sleeve 50 is actuated by means of a bell crank lever 56 pivotally mounted upon a fixed pivot 58 and connected by means of a connecting rod 60 to a diaphragm 62 contained within the housing 64 of a vacuum servo unit 66. A coil spring 68 normally holds the diaphragm 62 in its upper position as shown in Figure 1, and vacuum power supplied through the conduit 70 is adapted to overcome the spring 68 and pull the diaphragm 62 downwardly.

Conventional speed responsive control means (not shown) are utilized to supply vacuum to the servo unit 66 at a predetermined speed, as for example, 1000 engine R. P. M., to swing the bell crank lever 56 in a clockwise direction and to move the sleeve 50 along the rail 46. This sliding movement of the sleeve 50 preloads the coil spring 52 but does not, because of the left hand helix angle on the gears 34 and 26 and the resulting axial component of the gear tooth load, effect a movement of gear 34 to the left toward clutch engaging position.

The preloaded spring 52, however, can be effective to move the shift lever 44 to effect engagement between the clutch teeth 38 and 40 only upon a torque reversal through the speed reduction unit 10. This can be effected by momentarily closing the carburetor throttle by releasing the foot accelerator of the vehicle, which will eliminate the axial component of the gear tooth load between gears 34 and 26 and permit the gear 34 to be shifted toward gear 20 along the splines 36. Due to the difference of speed between the input and output gears 20 and 34, however, engagement of the clutch teeth 38 and 40 cannot be smoothly effected until the speeds of the gears are equal.

Synchronization between the gears 20 and 34 is obtained by means of a pair of cooperating annular blocker rings 72 and 74. The annular blocker ring 72 is L-shaped in cross section, having a radially extending flange 76 and an axially extending flange 78. Pins 80 nonrotatably secure the blocker ring 72 to the input gear 20 to effect rotation of the blocker ring 72 with the input gear as a unit. The axially extending flange 78 of the blocker ring 72 is formed with alternate slots 82 and tooth portions 84. The outer edge of each tooth portion 84 is V-shaped, having inclined edge portions 86.

The annular blocker ring 74 is also generally L-shaped in cross section, being provided with a radial flange 88 and an axial flange 90. The radial flange 88 engages a friction thrust washer 92 which in turn is seated against an annular flange 94 of the output gear 34 to effect a frictional engagement between the blocker ring 74 and the gear 34.

The axial flange 90 of the blocker ring 74 is formed with alternate stepped slots 96 and stepped tooth portions 98 completely around its circumferential extent. Each stepped tooth portion 98 has a narrow marginal portion 100 and a wider inner portion 102 interconnected by an inclined shoulder 104 having a same inclination as the inclined edge portions 86 of the tooth portions 84 upon the blocker ring 72. As a result, each slot 96 between adjacent tooth portions 98 is also stepped, having a wider outer portion adjacent the marginal portion 100 and a narrower inner portion adjacent the wider portion 102.

From the foregoing it will be seen that each tooth portion 84 of the blocker ring 72 as well as each tooth portion 98 of the blocker ring 74 is symmetrical about an axial line through its center. It will also be noted that the tooth portions 84 of the blocker ring 72 correspond generally in width to the width of the narrow inner portion of the slot 96 between the wider portions 102 of adjacent tooth portions 98 of the blocker ring 74 to permit the tooth portions 84 to slide into the narrow inner portions of the slots 96.

Normally the blocker rings 72 and 74 are held apart by a coil spring 106 so that the radial flange 88 of the blocker ring 74 will be urged against the friction washer 92 to effect frictional engagement with the output gear 34. Inasmuch as during the operation of the transmission the input gear 20 rotates faster than the output gear 34, the blocker rings 72 and 74 are rotated relative to each other to the position shown in Figure 2 in which the tooth portions 84 of the ring 72 engage the narrow portion 100 of the tooth portions 98 of the ring 74 at one side of the wide portions of the stepped slots 96.

As previously mentioned, the helix angle of the gears 34 and 26 produce an axial component of gear tooth load which normally keeps the clutch teeth 40 of the gear 34 out of engagement with clutch teeth 38 of the gear 20, even when the engine speed exceeds the predetermined amount necessary to actuate the vacuum servo unit 66 and preload the spring 52 on the shifter rail 46. A torque reversal, effected by momentarily closing the carburetor throttle, eliminates or reduces the axial component of the gear tooth load and, when the speeds of the gears 20 and 34 have become synchronized, enables the spring loaded shifter fork 44 to effect an axial movement of the output gear 34 and engagement of the clutch teeth 38 and 40 to produce a direct drive between the input and output shafts 12 and 18 of the speed reduction unit 10. This eliminates an objectionable ratcheting noise which might otherwise occur in the transition from underdrive to direct drive prior to the synchronization of the gears. It also eliminates a similar noise which would occur when the vehicle stands at idle and the engine is speeded up, as during a warm-up period, to a speed exceeding the speed at which the servo unit 66 is energized.

In addition to the foregoing, the construction of the present invention prevents dangerous partial engagement of the jaw clutch 42 when the input gear 20 is rotating slower than the output gear 34. This condition can occur when the vehicle is free wheeling in the underdrive or speed reduction ratio, this being permitted by the overrunning clutch 28 between the gears 22 and 26 on the countershaft 32. At this time the annular blocker ring 74 drives the blocker ring 72 and the engagement of the tooth portions 98 and 84 of the blocker rings respectively is effected at the opposite sides of the teeth from the engagement under the usual conditions described earlier. Here again the blocker rings prevent engagement until the speeds are synchronized, and it will be seen that the device thus is effective in both directions of torque application.

The angle of the shoulder 104 on the stepped tooth portion 98 of the blocker ring 74 and the corresponding angle of the inclined surfaces 86 on the tooth portions 84 of the blocker ring 72 are determined so that at torque reversal the angle exceeds the angle of friction of a normal surface. With this arrangement only a small amount of friction between the radial flange 88 of the blocker ring 74, the friction thrust washer 92 and the annular flange 94 of the gear 34 is sufficient to disengage the blocker and permit the shift to be effected.

Figure 4:
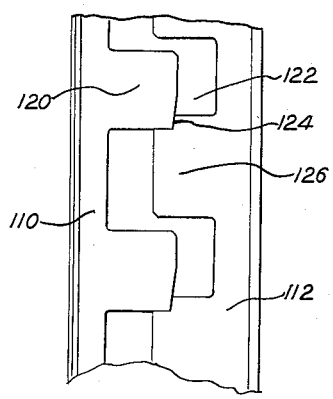
Figure 4 is an expanded elevational view of the annular blocker rings shown in Figure 3.

Reference is now made to the modification of the invention shown in Figures 3 and 4 in which annular blocker rings 110 and 112 are axially aligned and form interconnections between the impeller housing 114 of a hydraulic torque convertor 116 and the turbine 118 thereof. As seen in Figure 4, the blocker ring 110 has tooth portions 120 formed with inclined marginal edges 122 adapted to engage an inclined offset shoulder 124 formed on the tooth portions 126 of the blocker ring 112. A spring 128 normally urges the blocker rings apart and the engagement between the shoulder on the tooth portion 126 and the tooth portion 120 of the opposite blocker ring prevents axial movement of the hub 130 to effect a direct drive between the impeller 132 connected to the housing 114 and the turbine 118 until synchronization is reached.

It will be understood that the invention is not to be limited to the exact construction shown and described, but that various changes and modifications may be made without departing from the spirit and scope of the invention, as defined in the appended claims.

What is claimed is:

1. In a transmission having a pair of coaxial gears relatively axially shiftable with respect to each other, cooperating clutch elements carried by said gears to effect a direct drive therebetween when engaged, cooperating annular blocker rings associated with said pair of gears respectively, one of said blocker rings being secured to one of said gears for rotation therewith as a unit and the other of said blocker rings being frictionally engaged with the other of said gears, spring means urging said blocker rings apart, each of said blocker rings having a series of tooth portions projecting toward the other ring with the spaces between adjacent tooth portions of each ring corresponding in width to the width of the tooth portions of the other ring, the tooth portions of one of said rings having axially offset shoulders on each side of each tooth portion to block axial movement of said blocker rings and gears axially toward each other when one of said gears is rotating faster than the other of said gears in either direction of relative rotation.

2. The structure defined by claim 1 which is further characterized in that the axially offset shoulders on the tooth portions of one of said blocker rings are symmetrical on opposite sides of each tooth portion and form stepped slots between adjacent tooth portions of said last mentioned blocker ring with the outer portion of each stepped slot being wider than the tooth portions of the other blocker ring and with the inner portion of each stepped slot being substantially the same width as the width of the tooth portions of the other blocker ring to receive the latter when the speeds of the two gears are synchronized.

3. The structure defined by claim 2 which is further characterized in that the offset shoulders at opposite sides of the stepped slots are inclined at a small acute angle to a radial plane, the outer edges of the tooth portions of said other blocker ring being inclined at the same angle as the inclined offset shoulders.

4. In a transmission mechanism, an input shaft having a gear thereon, an axially aligned output shaft having a gear slidably mounted thereon, said first and second gears having jaw clutch teeth arranged on the adjacent faces thereof for interengagement, a countershaft, a pair of gears on said countershaft meshing respectively with said first and second gears, an overrunning clutch between the pair of gears upon said countershaft, a shifter fork engageable with said second gear to axially shift the latter into and out of engagement with the clutch teeth on said first gear, a speed responsive servo unit, a shiftable member actuated by said servo unit, spring means between said shiftable member and said shifting fork, said second gear and the one of said pair of gears on the countershaft meshing with said second gear having helical teeth arranged to produce an axial component of tooth gear load opposite to the movement of said shiftable member when said servo unit is energized, a pair of annular blocker rings associated with said first and second gears, one of said rings being secured to one of said gears for rotation therewith and the other of said rings having frictional engagement with the other of said last mentioned gears, spring means urging said blocker rings apart, and interengaging tooth portions on said blocker rings with the tooth portions of one ring being adapted to fit into the slots formed between the tooth portions of the other ring when said first and second gears are synchronized in speed, each of the tooth portions of said first and second blocker rings being symmetrical about their axial center lines to block engagement of the clutch teeth on said first and second gears in both directions of torque transmittal between said first and second gears.

5. The structure defined by claim 4 which is further characterized in that the tooth portions of one of said blocker rings each have an outer marginal portion and a wider inner portion forming a shoulder therebetween, said blocker rings being normally held apart a predetermined distance such that the outer marginal portions of the tooth portions of said one blocker ring are in circumferential alignment with the outer portions of the tooth portions of the other blocker ring so that said shoulders prevent axial movement of said first and second gears toward each other to effect engagement of said clutch teeth.

References Cited in the file of this patent

UNITED STATES PATENTS

| | | |
|---|---|---|
| 1,281,368 | Higinbotham | Oct. 15, 1918 |
| 2,567,446 | Polomski | Sept. 11, 1951 |
| 2,584,939 | Syrovy et al. | Feb. 5, 1952 |